United States Patent

Okuyama

[11] Patent Number: 5,558,580
[45] Date of Patent: Sep. 24, 1996

[54] BOOT

[75] Inventor: Koshi Okuyama, Shizuoka-ken, Japan

[73] Assignee: NOK Corporation, Tokyo, Japan

[21] Appl. No.: 357,248

[22] Filed: Dec. 13, 1994

[30] Foreign Application Priority Data

Dec. 15, 1993 [JP] Japan .................. 5-066858 U

[51] Int. Cl.$^6$ .................................................. F16D 3/84
[52] U.S. Cl. ........................ 464/175; 277/212 FB
[58] Field of Search ........................... 464/111, 132, 464/175, 173; 277/212 FB, 208

[56] References Cited

U.S. PATENT DOCUMENTS

| | | | |
|---|---|---|---|
| 4,278,262 | 7/1981 | Mizutani et al. | 277/212 FB |
| 4,673,188 | 6/1987 | Matsuno et al. | 277/212 FB |
| 4,820,238 | 4/1989 | Uchida et al. | 464/175 X |
| 4,852,891 | 8/1989 | Sugiura et al. | |
| 4,877,258 | 10/1989 | Alt et al. | 464/175 X |
| 4,995,623 | 2/1991 | Wada et al. | 277/208 |

*Primary Examiner*—Daniel P. Stodola
*Assistant Examiner*—Eileen A. Dunn
*Attorney, Agent, or Firm*—Jacobson, Price, Holman & Stern, PLLC

[57] ABSTRACT

A boot has two fixed portions (3, 4) formed with openings (1,2) wherein inner surfaces (3a, 4a) of at least either of the fixed portions (3, 4) are provided with lip portions (5) in which a rising angle (A1) of a slant on the inside of the boot in an axial section of the boot is larger than a rising angle (A2) of a slant on the outside of the boot.

7 Claims, 4 Drawing Sheets

BOOT

BACKGROUND OF THE INVENTION

The present invention relates to a boot for protecting a universal joint or the like mounted on a connecting portion of a propeller shaft, for example, from rain water, mud, etc., and particularly to a boot capable of preventing leakage of grease sealed into the boot.

For example, in a power transmission apparatus for transmitting the drive of an engine of an automobile to driving wheels, a universal joint such as an constant velocity joint is used. Dust boots are provided to protect the joint from rain water, mud, etc.

A conventional construction of a connecting portion between a drive shaft and a wheel is as shown in FIG. 4.

First, an constant velocity joint 20 includes an outer ring 21, an inner ring 22 and a ball 23. The outer ring 21 is secured to a wheel (not shown), whereas the inner ring 22 is secured to a drive shaft 24.

Further, the ball 23 is interposed between the outer ring 21 and the inner ring 22 whereby the driving force of the drive shaft 24 can be transmitted to the wheel while uniformly maintaining the number of revolutions of the drive shaft 24 and following the steering and up- and downward movement of the wheel.

A boot 25 formed of rubber or resin is mounted between the drive shaft 24 and the outer ring 21 in order to protect the outer ring 21, the inner ring 22, and the ball 23 constituting the constant velocity joint 20 from rain water, mud, etc.

The conventional boot 25 has anaxially expansible bellows portion 26, opposite ends of which are formed with openings 27 and 28, fixed portions 29 and 30 being formed to secure the boot to the outer ring 21 of the constant velocity joint 20 and the drive shaft 24.

The boot 25 is mounted to the outer ring 21 and the drive shaft 24 while spreading on the fixed portions 29 and 30, and finally a clamp 31 is fastened to thereby secure the boot 25 to the outer ring 21 of the constant velocity joint and the drive shaft 24.

Since grease supplied to the sliding portion of the constant velocity joint is sealed into the boot, it is necessary to secure the sealing property between the inner surfaces of the fixed portions, and the outer ring and the drive shaft.

In the past, as the construction for improving the sealing property of the kind as described, there has been proposed an arrangement wherein, as shown in FIG. 5A, annular projections 32 are formed on the inner surfaces of the fixed portions 29 and 30, and the projections 32 are crushed by the compressive force when the clamp 31 is fastened.

However, the projections 32 heretofore proposed had the construction that the projections were compressed verticaly relative to the contact surface making use of the fastening force of the clamp. The fastening force of the clamp or band is shown by the downward arrow in FIG. 5B. Therefore, the distribution of the surface pressure acting on the shaft 24 from the projections 32 was uniform in the axial direction as shown in FIG. 5B. If the fixed portion 30 of the boot is deviated toward the inside of the boot, the distribution of the surface pressure acting on the shaft 24 from the projections 32 varies so that the surface pressure of the inside of the boot lowers. For this reason, the grease sealed into the boot was likely to leak.

SUMMARY OF THE INVENTION

The object of the present invention is to improve the sealing property of fixed portions to prevent grease from being leaked.

According to the present invention, a boot has plural fixed portions (3,4) formed with openings in that inner surfaces of at least either of the fixed portions are provided with lip portion in which a rising angle of a slant on the inside of the boot in an axial section of the boot is larger than a rising angle of a slant on the outside of the boot.

After the openings of the boot have been inserted into a member to be mounted, the fixed portions are fastened from the outer surface by means of a clamp or the like. Then, the lip portion formed on the inner surface of the boot is crushed by the fastening force from the clamp.

A boot according to the present invention has a lip portion wherein a rising angle of a slant on the inside of the boot in an axial section of the boot is larger than a rising angle of a slant on the outside of the boot. The distribution of surface pressure acting on the contact surface of the member to be mounted by the lip portion is high on the inside of the boot. Accordingly, even if the fastening force of the clamp is somewhat uneven so that the fixed portions are deviated toward the inside of the boot, the surface pressure inside the boot is maintained so that the grease sealed in the boot is not leaked.

EMBODIMENTS

Preferred embodiments of the present invention will now be described with reference to the drawings.

Figure 1:
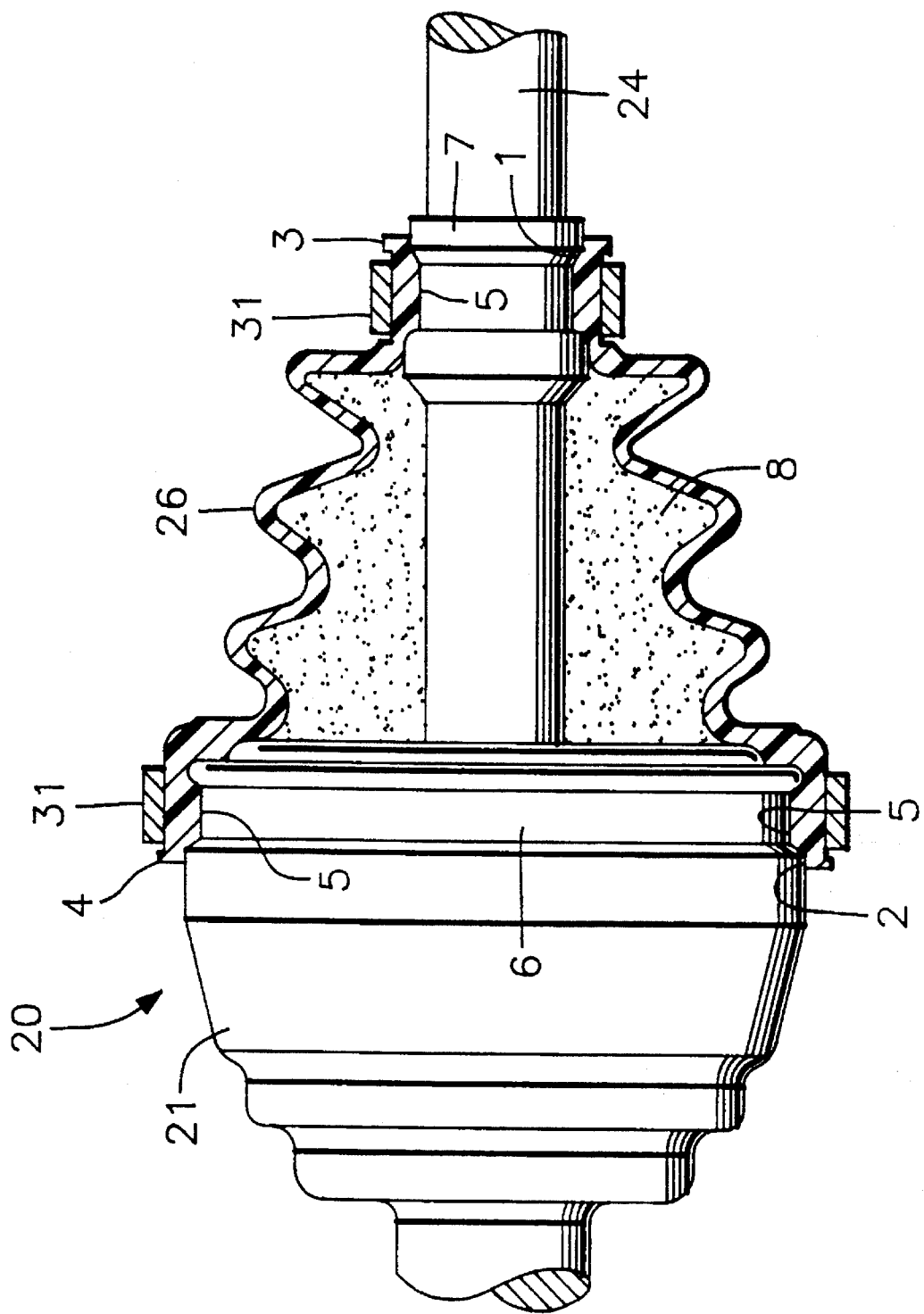
FIG. 1 is a sectional view showing a boot according to one embodiment of the present invention.
Figure 2:
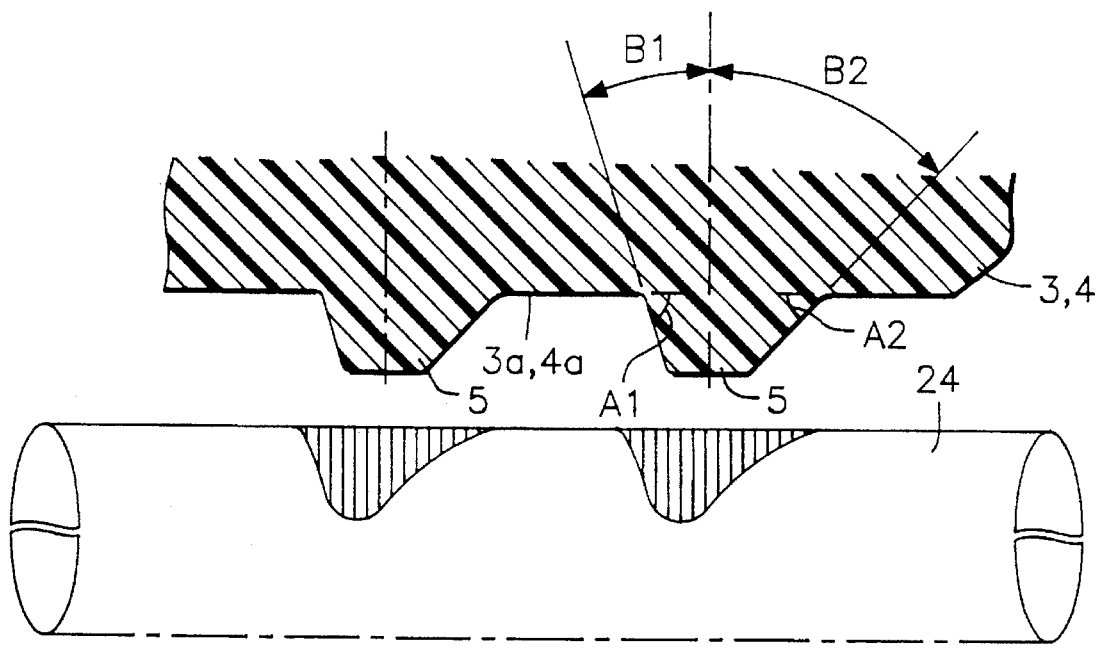
FIG. 2 is an enlarged sectional view showing a fixed portion of the boot in the embodiment of FIG. 1.
Figure 3A:
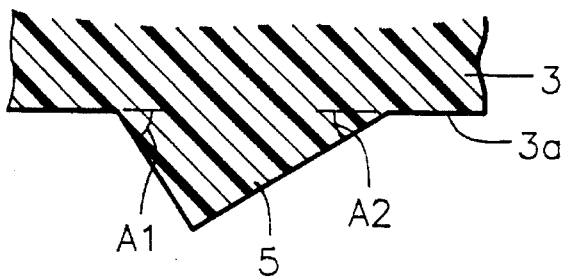
FIG. 3 and FIG. 3B are enlarged sectional views showing a lip portion according to another embodiment of the present invention.
Figure 3B:
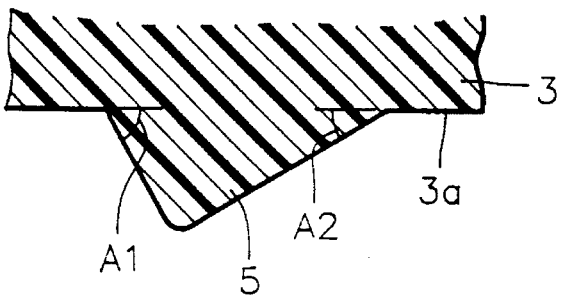
Figure 4:
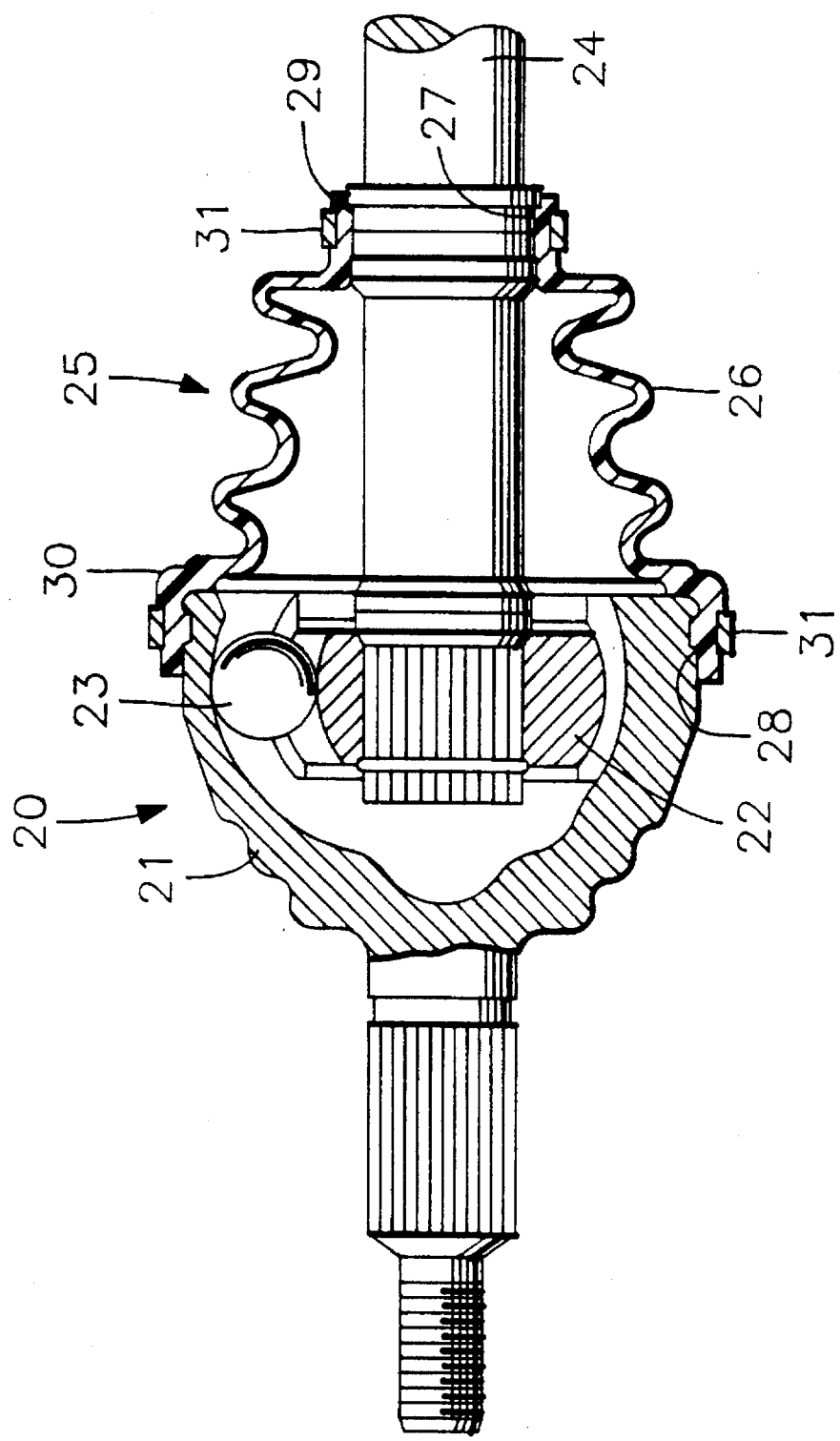
FIG. 4 is a sectional view showing a conventional boot.
Figure 5A:
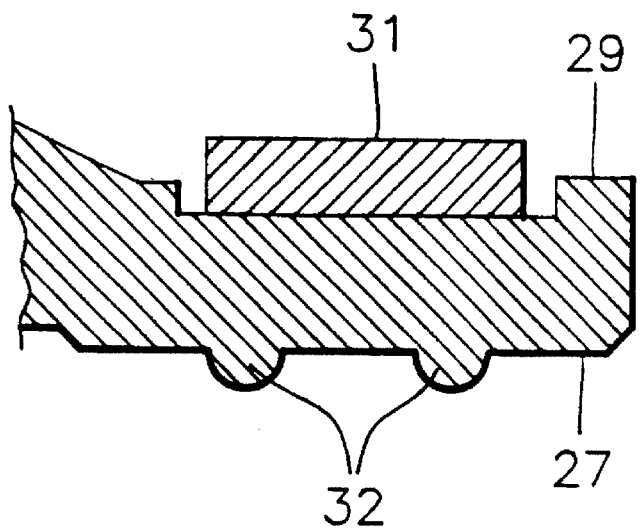
FIG. 5A and FIG. 5B are enlarged sectional views showing a fixed portion of conventional boots.
Figure 5B:
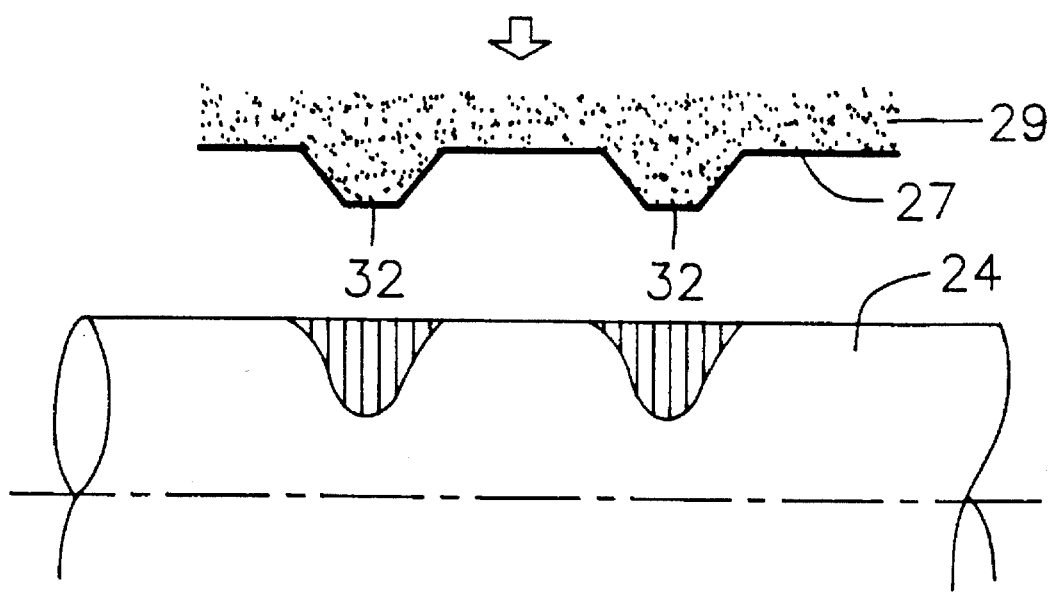

FIG. 1 is a sectional view showing essential parts of a boot for an automotive vehicle according to the present invention. FIG. 2 is an enlarged sectional view showing a fixed portion at the drive shaft side in the embodiment shown in FIG. 1. FIGS. 3A and 3B are respectively enlarged sectional views of a lip portion showing another embodiments according to the present invention.

As shown in FIG. 1, a boot according to the present invention has two openings 1 and 2 formed on opposite ends of a tubular body. The opposite ends are respectively inserted onto and secured to an outer ring 21 of a constant velocity joint 20 and a drive shaft 24. Bellows 26 are formed between the outer ring 21 and both fixed portions 3 and 4 of the drive shaft 24 so that the former can be expanded and oscillated.

Material for the boot may be either rubber or synthetic resin. Preferably, the boot is formed of synthetic resin in terms of reducing the weight thereof. In case the boot is formed of synthetic resin, preferably, blow molding is preferably employed because injection molding of the bellows 26 is usually difficult.

Particularly, according to the present invention, inner surfaces 3a and 4a of the fixed portions have lip portions 5 asymmetrical relative to the axial direction of the boot. A rising angle A1 of a slant on the inside of the boot in an axial section of the boot is larger than a rising angle A2 of a slant on the outside of boots. Even if the boot is formed of a relatively hard synthetic resin, there occurs no problems such that grease sealed in the boot leaks.

One fixed portion 4 of the boot according to the present invention is mounted on the outer ring 21 of the constant velocity joint 20 and fastened and fixed by a clamp 31. The outer ring 21 of the constant velocity joint 20 is formed with an annular recess 6, whereas the inner surface 4a of the fixed portion 4 of the boot is formed into a shape that can be fitted in the annular recess 6.

Such fixing means is not limited merely to the embodiment shown in FIG. 1 but various means can be used. However, preferably, the recess 6 is formed at least in the outer ring 1 in order to prevent the boot from being dropped out in the axial direction.

The other fixed portion 3 of the boot is mounted on the outer peripheral end surface of the drive shaft 24 and fixed by a clamp 31. The outer peripheral surface of the drive shaft 24 is formed with an annular shoulder 7 in order to prevent the boot from being displaced in position in the axial direction.

Such fixing means is likewise not limited merely to the embodiment shown in FIG. 1 but various means can be used.

Incidentally, in case the boot according to the present invention is applied to the constant velocity joint 20 of the drive shaft, it is usually necessary to determine the inner-diameter dimensions of both openings 1 and 2 of the boots according to the outside diameters of the outer ring 21 and the drive shaft 24, respectively, because the outside diameter of the outer ring 21 of the constant velocity joint is different from that of the drive shaft 24.

Accordingly, the shape of the boot is apt to result in a conical shape of which end is cut off as shown in FIG. 1. However, the boot according to the present invention is not limited to the shape as described but, in short, both the openings 1 and 2 can be formed according to members to be mounted. The bellows 26 need not be formed between both the fixed portions 3 and 4 but the construction merely having flexibility will suffice.

As shown in FIG. 2 in an enlarged scale, the boot according to the present invention has inner surfaces 3a and 4a of the fixed portions 3 and 4 on the side of the constant velocity joint 20 and on the side of the drive shaft 24 and a lip portion or lip portions 5 asymmetrical relative to the axial direction of the boot. Preferably, the lip portions 5 are formed over the entire periphery in the circumferential direction of the fixed portions 3 and 4.

The shape of the lip portion 5 will be a projection in which a rising angle A1 of a slant on the inside of the boot in an axial section of the boot is larger than a rising angle A2 of a slant on the outside of the boot. This is equivalent to the fact that an angle B1 formed by a slant on the inside of the boot relative to a center line of the end of the lip portion 5 is smaller than an angle B2 formed by a slant on the outside of the boot. In each of FIGS. 2, 3A, 3B and 5B, the interior of the boot is in the left direction and the exterior of the boot is in the right direction.

The number of lip portions 5 is not limited to the double as shown in FIG. 2 but the number of lip portions 5 may be more or less than two.

Further, the sectional shape of the lip portion 5 is not limited to a trapezoid as shown in FIG. 2, but, for example, a triangle whose end is sharp as shown in FIG. 3A or a triangle whose end is round as shown in FIG. 3B may be employed.

It is preferable in the embodiments of FIGS. 2, 3A and 3B that the angle A1 ranges from 45° to 90°, the angle A2 ranges from 15° to 75°, and the difference between A1 and A2 ranges from 15° to 75°.

The operation will now be described. The one fixed portion 4 of the boot according to the embodiment of FIG. 1 is inserted into the outer ring 21 of the constant velocity joint 20 and fixed by the clamp, whereas the other fixed portion 3 is inserted into the outer peripheral surface of the drive shaft 24 and fixed by the clamp 31. Thereby, a space 8 within the boot is closed so that the constant velocity joint 20 can be protected from rain water and mud. Grease is sealed in advance into the boot in order to maintain good slidability of the constant velocity joint 20.

By fastening the clamp 31, the lip portions 5 formed on the inner surfaces 3a and 4a of the boot are crushed against the contact surfaces of the outer ring 21 and the drive shaft 24, respectively. At this time, the distribution of the surface pressure acting on these contact surfaces of the lip portions 5 is high to be biased toward the inside of the boot as shown in FIG. 2. Accordingly, the grease passing through the clearances in the fixed portions 3 and 4, the outer ring 21 and the drive shaft 24 is shut off on the inside of the boot. As a result, even if the fastening force of the clamp 31 is somewhat uneven or the fixed portions are axially deviated, the grease will not leak outside.

The above-explained embodiments have been shown for better understanding of the present invention and have not been described to limit the present invention. Accordingly, it is intended that various elements disclosed in the embodiments include all the changes in design and equivalents belonging to the scope of the present invention.

For example, while, in the above-mentioned embodiments, an example has been illustrated in which the boots of the present invention are applied to the even speed joint in which members to be mounted are expanded or oscillated with each other, it is to be noted that the boots of the present invention are not limited to the even speed joint but can be applied to all other parts.

Further, the lip portions 5 need not be formed on both the fixed portions 3 and 4 as mentioned above but may be formed on either of them.

According to the present invention, either of inner surfaces of the fixed portions has a lip portion in which a rising angle of a slant on the inside of boots in an axial section of the boots is larger than a rising angle of a slant on the outside of boot. The distribution of surface pressure is biased toward the inside of the boot. Accordingly, even if the grease tends to pass through the clearance between the fixed portions from the inside of the boot and leak outside, it is immediately shut off on the inside of the fixed portions to thereby prevent the grease from leaking further. The surface pressure on the inside of the boots can be increased to prevent the grease from staying in the clearance between the fixed portions, thus preventing the fixed portions from being deviated in the axial direction. As a result, the state when the boot is mounted, that is, the adequate bias of the surface pressure can be maintained so that not only when the boot is mounted but use for a long period is made, grease does not likely leak.

What is claimed is:

1. A boot comprising an interior and an exterior and including two end portions each having a respective boot opening, at least one of the two end portions having an inner surface adapted to contact a shaft or an outer ring surrounding the shaft on which two lip portions are provided so as to form a closed space between said two lip portions each of the two lip portions having a first slant defining a first surface facing toward the boot interior and a second slant defining a second surface facing toward the boot exterior, a first rising angle of each slant in an axial section of the boot being larger than a second rising angle of each second slant.

2. The boot as claimed in claim 1, wherein the boot is made of synthetic resin for protecting a universal joint mounted on a connecting portion of a propeller shaft.

3. The boot as claimed in claim 2, wherein one of fixed portions is mounted on the outer ring of a constant velocity joint and fixed by a clamp while the other fixed portion is mounted on the shaft, which is a drive shaft, and fixed by another clamp.

4. The boot as claimed in claim 1, wherein a bellows (26) is formed between the fixed portions.

5. The boot as claimed in claim 1, wherein the lip portion has a trapezoid shape in cross section.

6. The boot as claimed in claim 1, wherein the lip portion has a substantially triangular in cross section shape which projects.

7. The boot as claimed in claim 1, wherein the first rising angle ranges from 45° to 90°, and the second rising angle ranges from 15° to 75°, and the difference between the first and second rising angles ranges from 15° to 75°.

* * * * *